Aug. 4, 1953     H. KOCH     2,647,549
DEVICE FOR DIVIDING FRUITS
Filed Dec. 12, 1950
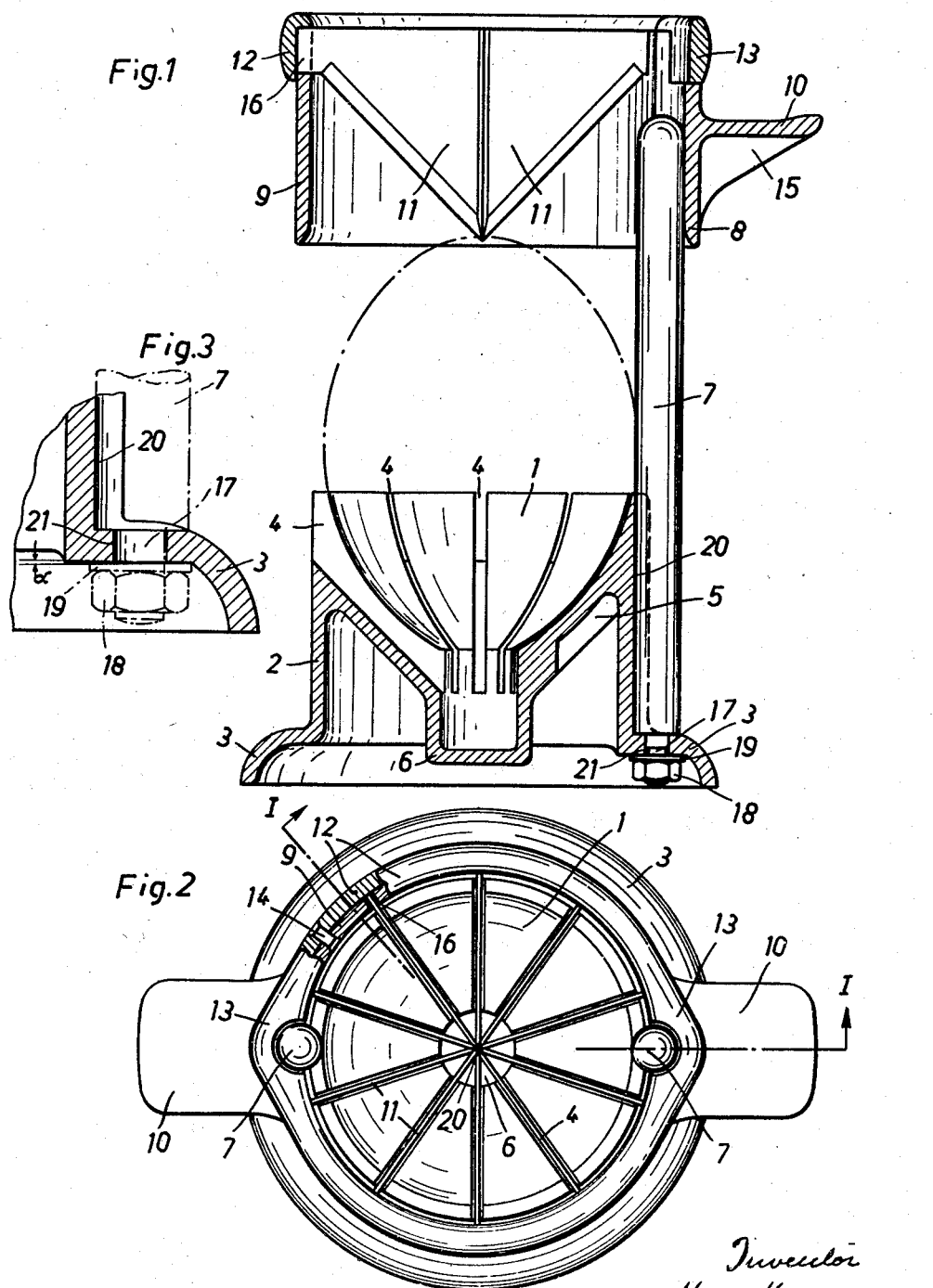
Inventor
HANS KOCH
by Walter S. Heston
ATTORNEY Patented Aug. 4, 1953

2,647,549

UNITED STATES PATENT OFFICE 2,647,549

DEVICE FOR DIVIDING FRUITS

Hans Koch, Munich-Pasing, Germany

Application December 12, 1950, Serial No. 200,340
In Germany February 10, 1950

4 Claims. (Cl. 146—3)

The invention relates to an apparatus for the dividing of fruits, more particularly lemons and oranges, into wedge-shaped parts. Such devices are known as lemon cutters.

It is an object of the present invention to provide a design of a lemon cutter which can be manufactured at low cost and of a material of low price, while being efficient in use.

A further object of the invention is to provide for an arrangement and fastening of the rods guiding the knife system at the dish or bowl carrying the fruit such that a rigid and durable connection of the metallic guide rods with the dish made of plastics as well as an exact spacing in parallel relationship of the guide rods is obtained. The invention further provides an improvement of the collection of the flowing out fruit juice.

With these and further objects in view, according to the present invention the lemon cutter comprises a dish or bowl-shaped part and a knife holder made of a molding composition and in a shape by which the collection of the flowing out fruit juice is improved, the dish is shaped in the form of a hollow body, integral with the elevated foot or base part connected to its rim, and provided with radial grooves preferably lying in ribs extending in an inclined downward direction, and terminating in a trough or recess in the center of the dish. The vertical surfaces are slightly inclined. This molded article can be made in one operation.

The holder of the star-shaped knife system consists of a sleeve adapted to be telescoped over the dish and provided with lateral handles, semicircular bulges for guidance at the guide rods which are fastened to the base of the dish, and with radial incisions at its upper rim for insertion of the star-shaped knife system which is fastened in the holder by means of a closing ring covering the rim of the sleeve and being riveted or screwed to the sleeve. The conical star-shaped knife system is preferably composed of loose single knives whose inner edges are wedge-shaped in such a way that the knives can be joined in the center axis of the star system so as to form a self-supporting unit. In this manner thickened connecting portions in the center can be dispensed with, so that the fruit can be smoothly and easily pierced or cut through.

Other and further objects, features and advantages of the invention will be pointed out hereinafter and appear in the appended claims forming part of the application.

In the accompanying drawing a now preferred embodiment of the invention is shown by way of illustration and not by way of limitation.

Fig. 1 is a vertical section on line I—I of Fig. 2 showing a lemon cutter having the invention applied thereto, Fig. 2 is a plan view thereof.

Fig. 3 is a detail section of Fig. 1 in an enlarged scale.

Referring now to the drawing in greater detail, it will be seen that the dish or bowl 1 is jointed to the hollow cylindrical elevation 2 of the base 3, thus forming a hollow body which can easily be manufactured from plastic material. The bowl 1 is provided with radial slots 4 whose downwardly directed inclined channels are disposed in ribs 5 and issue into the recess or trough 6 serving to collect the fruit juice.

The guide rods 7 of metal are fastened to the base 3 of the bowl 1 in diametrically opposed holes 21 provided therein. For this purpose the guide rods 7 carry threaded end portions 17 with their ends projecting through the base 3 for the reception of washers 19 and nuts 18, the lower surface of the base 3, at least in so far as it is serving as an area of contact for the nut 18 and the washer 19, being slightly inclined with respect to the horizontal line such as to include, for example, an angle of 0.5° with the horizontal line, so that the guide rods by tightening the nut 18 will be firmly held against the substantially semi-cylindrical bearing surfaces 20 on both sides of the bowl 1. By an exactly parallel arrangement of the cylindrical beddings 20 in the bowl-shaped part 1 of molded material there is insured also a durable parallel relationship of the two guide rods 7 owing to the continuous lateral pressure exerted thereon produced by the tightening of the nuts 18 forcing them into said beddings. The guide rods 7 are engaging bulged portions 8 of the sleeve 9 consisting of molded material and provided with flat handles 10 reinforced by ribs 15.

The star-shaped knife system 11 is engaged in incisions 16 at the rim of the holder sleeve 9 and covered in an upward and lateral direction by a backed-off cover or closing rim 12 whereby it is fastened in the holder. The closing rim 12 is provided with semi-circular bulged portions 13 for sliding reception of the guide rods or columns 7 and connected to the holder sleeve by a plurality of rivets 14. The conical star-shaped knife system 11 is composed of ten loose single knives whose wedge-shaped inner edges 20 serve to join the knives immovably. The grooves 4 have the same inclination as the knife blades so that the same on crossing the fruit will abut the grooves throughout their length.

The molded articles 1—2—3, 9 and 12 may consist of any of the known molding compositions. By way of example, they may be made of synthetic resin, such as, phenol formaldehyde condensation products, urea condensation products, cellulose derivatives, polyvinyl products, polystyrol or other styrene products or the like.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

What is claimed is:

1. A device for dividing fruits, e. g. lemons or oranges, comprising an integral body including a hollow cylindrical portion, a base portion joined to the lower rim of said cylindrical portion, and a bowl-shaped portion joined to the upper rim of said cylindrical portion so as to extend towards said lower rim, and being provided with radial grooves, said cylindrical portion being provided on its outside with two opposite vertical grooves of substantially half circular cross-section, a pair of vertical guide rods secured to said base so as to be embedded with substantially half the outer surfaces of their lower portions in said vertical grooves respectively, a sleeve-shaped member and a system of knives interiorly of and secured to said sleeve and adapted to engage said radial grooves of said bowl, said sleeve-shaped member being adapted to be telescoped over said cylindrical portion and being provided with two opposite vertical inner grooves in which said rods respectively, engage, each inner groove of said member substantially complementing one of said outer grooves of said cylindrical portion to the cross-section of the associated rod whereby said sleeve member can be shifted down with its lower rim as far as said base portion.

2. A device as claimed in claim 1 wherein said knife-system forms a downwardly projecting central point, said bowl-shaped portion being provided with a lower recess for the reception of said point and the collection of juice into which recess said grooves issue.

3. A device as claimed in claim 1 further comprising means to urge said rods into said vertical grooves of said cylindrical portion so as to insure parallelism of said rods.

4. A device as claimed in claim 1 said rods having reduced threaded end portions projecting through holes in said base portion for the reception of a washer and a nut, the lower side of said base being inclined in relation to a horizontal line at least inasmuch as it serves as an area of contact for said washers thereby firmly to hold said rods in said vertical grooves of said cylindrical portion in parallel relationship.

HANS KOCH.

References Cited in the file of this patent

UNITED STATES PATENTS

| Number | Name | Date |
|---|---|---|
| 1,040,582 | Royer et al. | Oct. 8, 1912 |
| 1,943,113 | Daum | Jan. 9, 1934 |
| 2,329,918 | Leavens | Sept. 21, 1943 |

FOREIGN PATENTS

| Number | Country | Date |
|---|---|---|
| 146,222 | Switzerland | July 1, 1931 |
| 379,926 | Great Britain | Sept. 8, 1932 |